(12) United States Patent
Ko et al.

(10) Patent No.: US 7,994,499 B2
(45) Date of Patent: Aug. 9, 2011

(54) SEMICONDUCTOR PROBE HAVING WEDGE SHAPE RESISTIVE TIP AND METHOD OF FABRICATING THE SAME

(75) Inventors: Hyoung-soo Ko, Yongin-si (KR);
Ju-hwan Jung, Yongin-si (KR);
Seung-bum Hong, Yongin-si (KR);
Hong-sik Park, Yongin-si (KR);
Chul-min Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 407 days.

(21) Appl. No.: 11/750,404

(22) Filed: May 18, 2007

(65) Prior Publication Data

US 2008/0078239 A1 Apr. 3, 2008

(30) Foreign Application Priority Data

Oct. 2, 2006 (KR) ........................ 10-2006-0097412

(51) Int. Cl.
*H01L 21/00* (2006.01)
(52) U.S. Cl. ........................................................ 257/41
(58) Field of Classification Search ...................... 257/41
See application file for complete search history.

(56) References Cited

U.S. PATENT DOCUMENTS

| 7,081,624 | B2 * | 7/2006 | Liu et al. | 250/306 |
| 7,411,210 | B2 * | 8/2008 | Jung et al. | 257/48 |
| 2005/0052984 | A1 * | 3/2005 | Hong et al. | 369/126 |

FOREIGN PATENT DOCUMENTS

| JP | 2002-168761 A | 6/2002 |
| JP | 2006-066064 A | 3/2006 |
| JP | 2006-078485 A | 3/2006 |
| JP | 2006-514741 A | 5/2006 |
| JP | 2006-194879 A | 7/2006 |
| KR | 1020060019365 A | 3/2006 |
| WO | 03/096409 A1 | 11/2003 |

* cited by examiner

*Primary Examiner* — N Drew Richards
*Assistant Examiner* — Jae Lee
(74) *Attorney, Agent, or Firm* — Sughrue Mion, PLLC

(57) ABSTRACT

A semiconductor probe having a wedge shape resistive tip and a method of fabricating the semiconductor probe is provided. The semiconductor probe includes a resistive tip that is doped with a first impurity, has a resistance region doped with a low concentration of a second impurity having an opposite polarity to the first impurity, and has first and second semiconductor electrode regions doped with a high concentration of the second impurity on both side slopes of the resistive tip. The probe also includes a cantilever having the resistive tip on an edge portion thereof, and an end portion of the resistive tip has a wedge shape.

4 Claims, 13 Drawing Sheets

SEMICONDUCTOR PROBE HAVING WEDGE SHAPE RESISTIVE TIP AND METHOD OF FABRICATING THE SAME

CROSS-REFERENCE TO RELATED PATENT APPLICATION

This application claims priority from Korean Patent Application No. 10-2006-0097412, filed on Oct. 2, 2006, in the Korean Intellectual Property Office, the disclosure of which is incorporated herein in its entirety by reference.

BACKGROUND OF THE INVENTION

1. Field of the Invention

The present invention relates to a semiconductor probe having a wedge shape resistive tip and a method of fabricating the same and, more particularly, to a semiconductor probe having a wedge shape resistive tip in which electrodes are formed on both sides of the resistive tip, and a method of fabricating the same.

2. Description of the Related Art

With the increase in demand for small electronic devices such as mobile communication terminals and personal digital assistants comes the need for ultra small highly integrated recording media. However, since miniaturization of the conventional hard disk is not easy, and high integration of flash memory is also difficult, research is also conducted on information storage devices using a scanning probe.

A scanning probe is used for various scanning probe microscopic (SPM) techniques. Examples of these are a scanning tunneling microscope (STM), that reads information by detecting a current that flows according to a voltage difference applied between a scanning probe and a specimen, an atomic force microscope (AFM), that uses an atomic force between a scanning probe and a specimen, a magnetic force microscope (MFM) that uses a magnetic force between a magnetic field of a specimen and a magnetized scanning probe, a scanning near-field optical microscope (SNOM) that overcomes the resolution limits of visible light, and an electrostatic force microscope (EFM) that uses electrostatic charge between a specimen and a scanning probe.

In order to read and write information at high speed and high density using the SPM techniques, the scanning probe must be able to detect the surface charge of regions as small as a few tens of nanometers in diameter. Also, in order to increase the read and write speed, cantilevers must be fabricated in an array.

FIG. 1 is a cross-sectional view of a cantilever 70 having a resistive tip 50 disclosed in International Patent Publication No. WO 03/096409. The resistive tip 50 is formed vertically on the cantilever 70, can be fabricated in an array, and can have a resistance region 56 with a diameter of a few tens of nanometers.

Referring to FIG. 1, the resistive tip 50 of a semiconductor probe includes a main body 58 doped with a first impurity, the resistance region 56 that is located on an end portion of the resistive tip 50 and is doped with a low concentration of a second impurity, and first and second semiconductor electrode regions 52 and 54 which are located on both side slopes of the main body 58 and are doped with a high concentration of the second impurity.

However, in the semiconductor probe having the conventional resistive tip 50, the regions of the slopes of the first and second semiconductor electrode regions 52 and 54 doped with a high concentration are reduced by excessive etching during a wet etching process for forming the resistive tip 50. Accordingly, the conductive regions on the slopes are reduced, which increases the resistance region 56, thereby reducing the spatial resolution of resistance variation.

SUMMARY OF THE INVENTION

The present invention provides a semiconductor probe having a wedge shape resistive tip having high spatial resolution.

The present invention also provides a method of fabricating a semiconductor probe having a wedge shape resistive tip having high spatial resolution.

According to an aspect of the present invention, there is provided a semiconductor probe comprising: a resistive tip that is doped with a first impurity, has a resistance region doped with a low concentration of a second impurity having an opposite polarity to the first impurity, and has first and second semiconductor electrode regions doped with a high concentration of the second impurity on both side slopes of the resistive tip; and a cantilever having the resistive tip on an edge portion thereof, wherein an end portion of the resistive tip has a wedge shape.

The end portion in a length direction of the wedge shape of the resistive tip may comprise the resistance region at a central portion of the end portion and the first and second semiconductor electrode regions formed on both sides of the resistance region.

The end portion of the resistive tip may have a width of 20 nm to 2 μm.

The first impurity may be a p type impurity and the second impurity may be an n type impurity.

According to another aspect of the present invention, there is provided a method of fabricating a semiconductor probe having a wedge shape resistive tip, comprising: providing a silicon substrate doped with a first impurity and a mask layer on an upper surface of the silicon substrate; forming a stripe shape photoresist on the mask layer and a stripe shaped first mask having a first width by etching the mask layer using the stripe shape photoresist as a mask; forming first and second semiconductor electrode regions by doping a second impurity, which has an opposite polarity to the first impurity, on regions of the silicon substrate except the region covered by the first mask; forming a resistance region doped with a low concentration of the second impurity between the first and second semiconductor electrode regions by annealing the silicon substrate; forming a rectangular second mask having the first width and a second width by patterning the first mask; forming a wedge shape resistive tip on an upper portion of the silicon substrate by etching the silicon substrate except a portion of the silicon substrate covered by the rectangular second mask; and forming a cantilever by etching a lower portion of the silicon substrate so that the resistive tip can be located on an edge of the cantilever.

The forming of the rectangular second mask may comprise patterning the first mask having the first width greater than the second width.

The first width may be 10 to 50% greater than the second width.

The first width may be 30 nm to 2 μm.

The forming of the rectangular second mask may comprise forming a stripe shape photoresist having a second width perpendicular to and crossing the first mask and etching the first mask using the stripe shaped photoresist having the second width as a mask.

The forming of the wedge shape resistive tip may further comprise annealing the silicon substrate to make the resistance regions between the first and second semiconductor electrode regions in contact.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
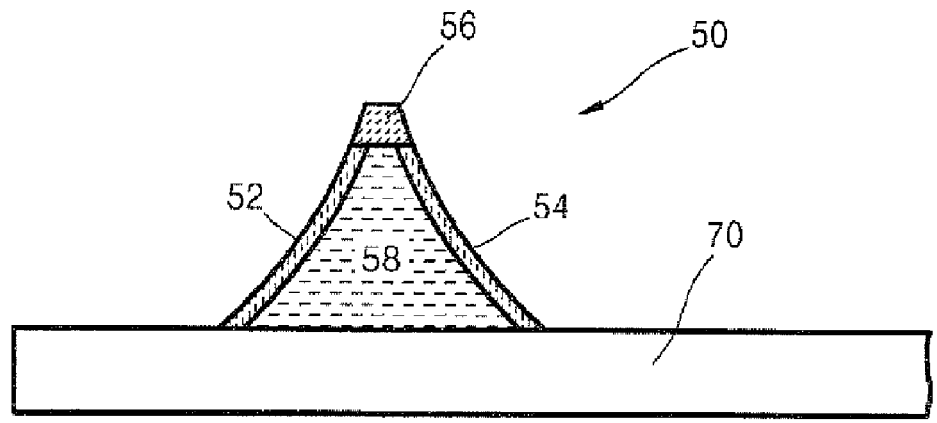
FIG. 1 is a cross-sectional view of a cantilever having a resistive tip disclosed in International Patent Publication No. WO 03/096409.

A semiconductor probe having a wedge shape resistive tip and a method of fabricating the semiconductor probe according to the present invention will now be described more fully with reference to the accompanying drawings, in which exemplary embodiments of the invention are shown. In the drawings, the thicknesses of layers and regions are exaggerated for clarity, and like reference numerals refer to like elements.

Figure 2:
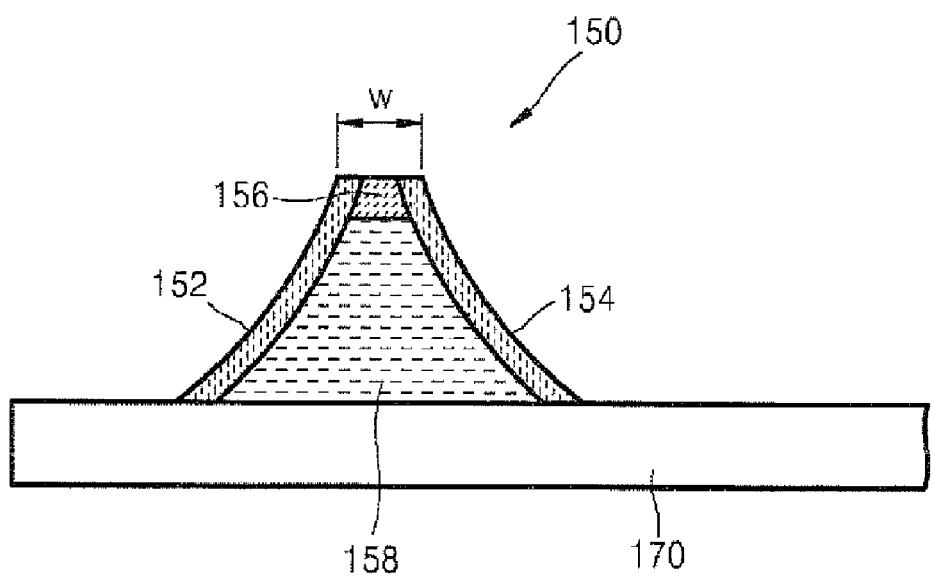
FIG. 2 is cross-sectional view of a tip portion of a semiconductor probe having a wedge shape resistive tip according to an exemplary embodiment of the present invention.

FIG. 2 is cross-sectional view of a tip portion of a semiconductor probe having a wedge shape resistive tip according to an exemplary embodiment of the present invention.

Referring to FIG. 2, a tip 150 of a semiconductor probe is formed vertically on one end of a cantilever 170. The tip 150 includes a main body 158 doped with a first impurity, a resistance region 156 formed on an end portion of the tip 150 and doped with a low concentration of a second impurity, and first and second semiconductor electrode regions 152 and 154, respectively, located on the side slopes of the tip 150 having the resistance region 156 therebetween and doped with a high concentration of a second impurity. Here, the first impurity may be a p type impurity, and the second impurity may be an n type impurity.

The end portion of the tip 150 has a wedge shape having a first width W. The resistance region 156 is formed in the central portion of the end portion of the tip 150, and the first and second semiconductor electrode regions 152 and 154 are formed on the respective sides of the resistance region 156. The resistance value of the resistance region 156 between the first and second semiconductor electrode regions 152 and 154 is reduced, since the first and second semiconductor electrode regions 152 and 154 formed on both sides of the resistance region 156 define the resistance region 156, thereby increasing the sensitivity to the resistance variation.

An electric field generated by surface charge 157 (refer to FIG. 3) of a recording medium causes a variation of resistance of the resistance region 156. The polarity and magnitude of the surface charge are correctly detected from the variation of the resistance. In the tip 150 according to the present exemplary embodiment, the conductive regions 152 and 154 at the wedge shape tip 150 confine the resistance region 156, to which the surface charge of the recording medium affects. Accordingly, even small variations of resistance can be detected, thereby increasing the spatial resolution.

The first width W of the wedge shape resistive tip 150 may be 20 nm to 2 μm. The manufacture of a wedge shape resistive tip having a width of less than 20 nm is difficult, and the tip can be formed in a point shape instead of a wedge shape. On the other hand, a wedge shape resistive tip having a width of greater than 2 μm reduces the sensing speed and, accordingly, reduces the spatial resolution.

Figure 3:
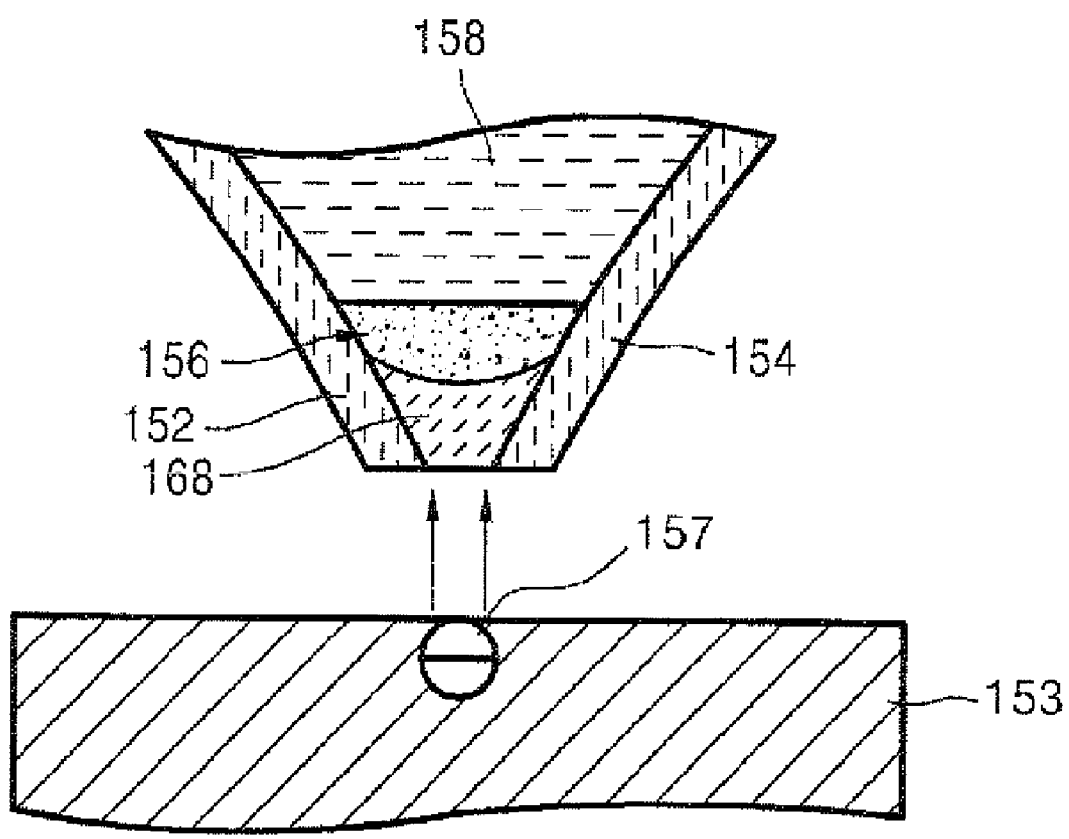
FIG. 3 is an enlarged view of an end portion of the tip of the semiconductor probe of FIG. 2.

FIG. 3 is an enlarged view of an end portion of the tip of the semiconductor probe of FIG. 2.

The operation of a semiconductor probe having a wedge shape resistive tip 150 according to an exemplary embodiment of the present invention will now be described with reference to FIG. 3.

In the wedge shape resistive tip 150, when the surface charge 157 of a recording medium 153 is detected, the resistance of the resistance region 156 is changed due to the reduction of the area of the resistance region 156 by a non-conductive depletion region 168. Accordingly, the polarity and magnitude of the surface charge 157 of the recording medium 153 can be detected from the variation of the resistance. It is seen that the non-conductive depletion region 168 is gradually expanded towards the main body 158 by an electric field generated by negative surface charge 157. In particular, the wedge shape resistive tip 150 according to the exemplary embodiment of the present invention has an increased resolution that detects resistance variation caused by an electric field in the resistance region 156, since the resistance region 156 is small and thus has low resistance.

Figure 4A:
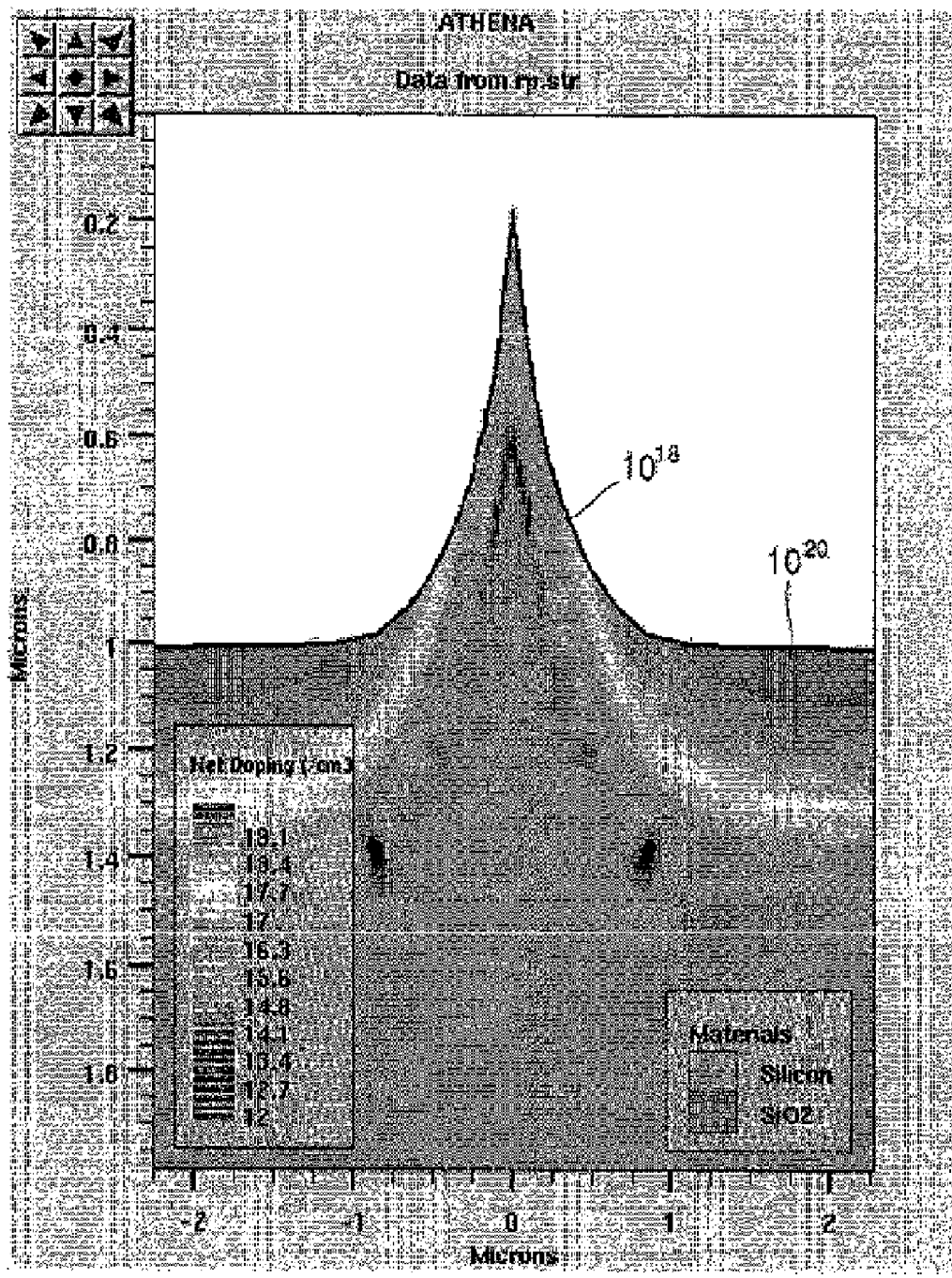
FIGS. 4A and 4B are graphs showing the results of simulation of doping concentration of the tip of FIGS. 1 and 2, respectively.
Figure 4B:
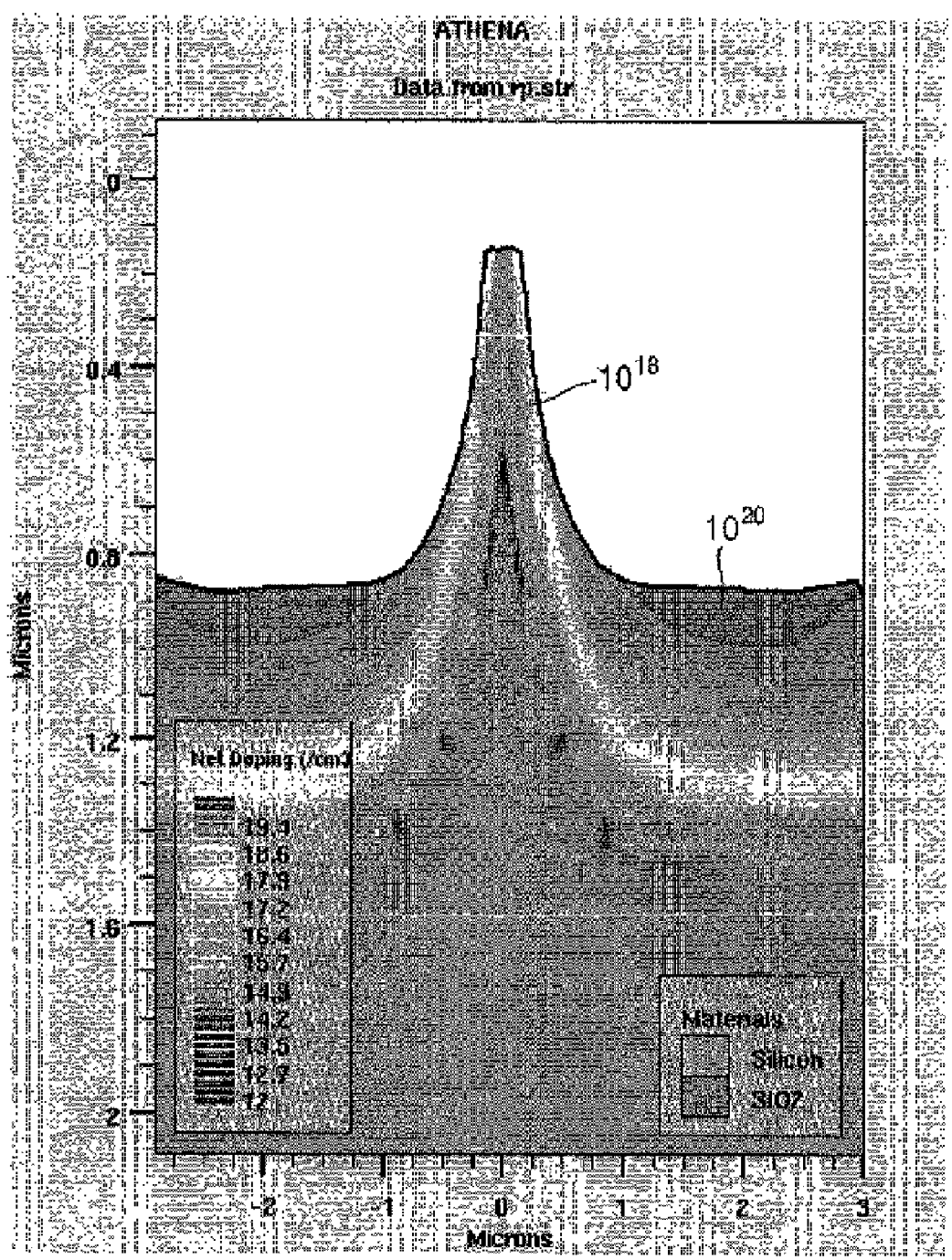

FIGS. 4A and 4B are graphs showing the results of simulation of doping concentration of the tip of FIGS. 1 and 2, respectively.

Referring to FIG. 4A, regions within 0.5 to 0.6 μm of the end portion of the tip are low concentration regions doped with a doping concentration of $10^{15} \sim 10^{17}/cm^3$. That is, the resistance region is large.

Referring to FIG. 4B, on an end portion of the wedge shape resistive tip, it is seen that a low concentration region doped with a doping concentration of $10^{15} \sim 10^{17}/cm^3$, that is, a resistance region, is formed between conductive regions doped with a doping concentration of $10^{18}/cm^3$. Accordingly, a very small resistance region, having a width of approximately 0.1 to 0.2 μm, is formed at the end portion of the tip. Therefore the resistance of the resistance region of FIG. 4B is lower than that of the resistance region of FIG. 4A.

Figure 5A:
FIGS. 5A and 5B are scanning electron microscope (SEM) images of the tips of FIGS. 1 and 2, respectively, viewed from the top.
Figure 5B:
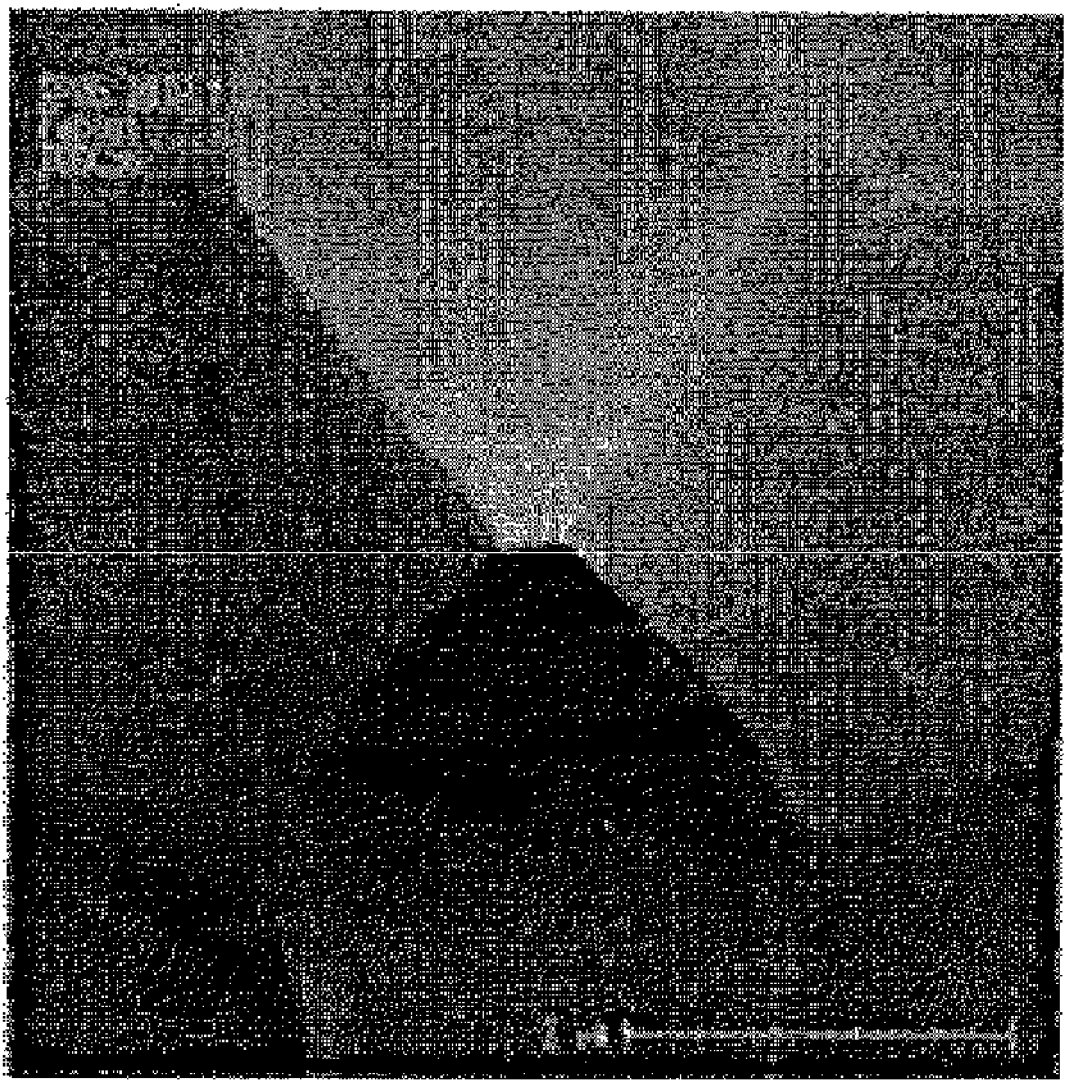

FIGS. 5A and 5B are scanning electron microscope (SEM) images of the tips of FIGS. 1 and 2, respectively, viewed from the top.

The tip of FIG. 5A has a quadrangular pyramid shape, but the tip of FIG. 5B has a wedge shape.

FIGS. 6A through 6I are perspective views sequentially illustrating a method of fabricating a wedge shape resistive tip according to an exemplary embodiment of the present invention.

Figure 6A:
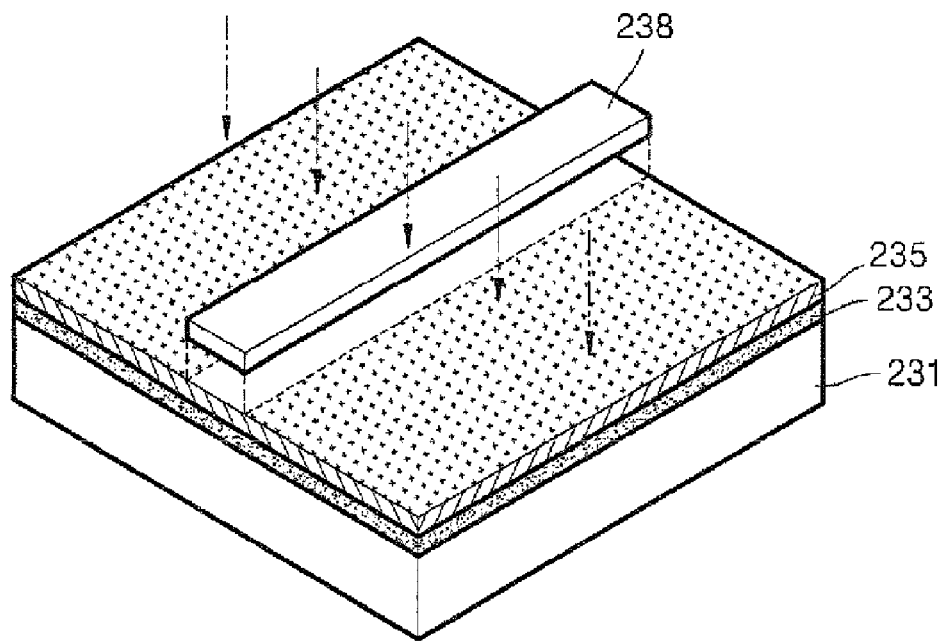
FIGS. 6A through 6I are perspective views sequentially illustrating a method of fabricating a wedge shape resistive tip according to an exemplary embodiment of the present invention.

Referring to FIG. 6A, a mask layer 233 is formed of silicon oxide or silicon nitride on the surface of a silicon substrate 231 doped with a first impurity, or a silicon on insulator (SOI) substrate. After a photoresist 235 is formed on the upper surface of the mask film 233, a stripe shape mask 238 is placed over the photoresist 235.

Figure 6B:
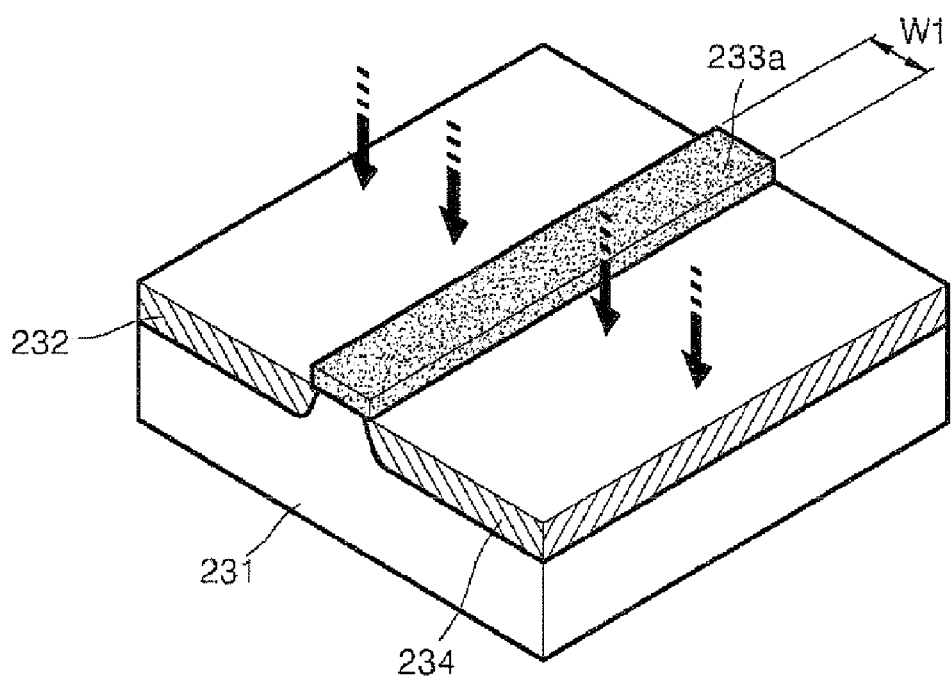

Referring to FIG. 6B, a stripe shaped first mask 233a is formed on the silicon substrate 231 by exposure, developing, and etching. The stripe shape mask 238 controls the first width W1 of the stripe shaped first mask 233a. The first width W1 is related to the length of a wedge shape, and may be 30 nm to 2 μm Next, first and second semiconductor electrode regions 232 and 234 are formed by doping the substrate 231 except a region covered by the stripe shaped first mask 233a with a high concentration of a second impurity. The first and second semiconductor electrode regions 232 and 234 act as conductors since they have very low resistance.

Figure 6C:
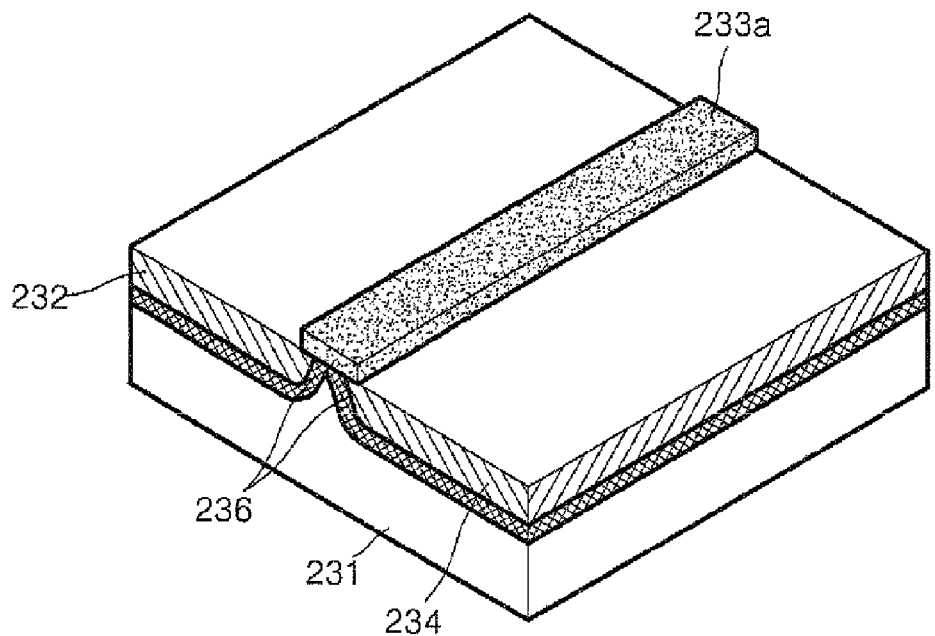

Referring to FIG. 6C, when the silicon substrate 231 is annealed, resistance regions 236 having a low concentration of the second impurity are formed by diffusing the second impurity from the first and second semiconductor electrode regions 232 and 234, which have a high concentration of the second impurity. The resistance regions 236 under the stripe shaped first mask 233a may contact each other. The contact of the resistance regions 236 may be achieved by adding an annealing process.

Figure 6D:
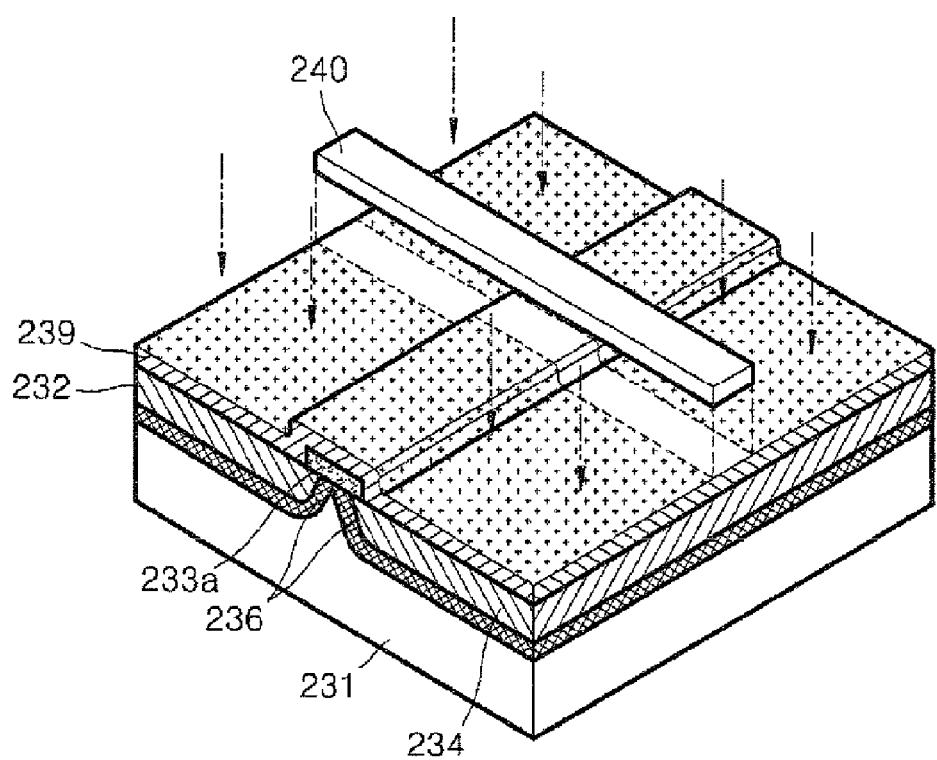
Figure 6E:
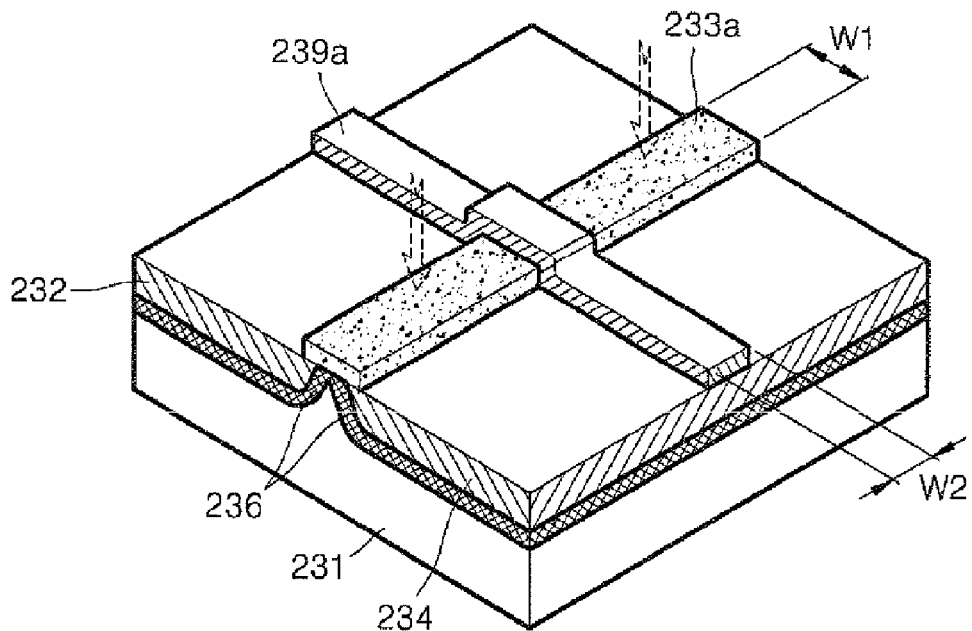

Referring to FIGS. 6D and 6E, a photoresist layer 239 covering the stripe shaped first mask 233a is coated on the upper surface of the silicon substrate 231, and a stripe shape photomask 240 is placed over the photoresist layer 239, perpendicularly crossing the stripe shaped first mask 233a. Next, exposure, developing, and etching are performed to create a photoresist layer 239a having the same shape as the stripe shape photomask 240. The stripe shape photomask 240 controls a second width W2 of the stripe shaped first mask 233a. The first width W1 may be 10 to 50% greater than the second width W2.

Figure 6F:
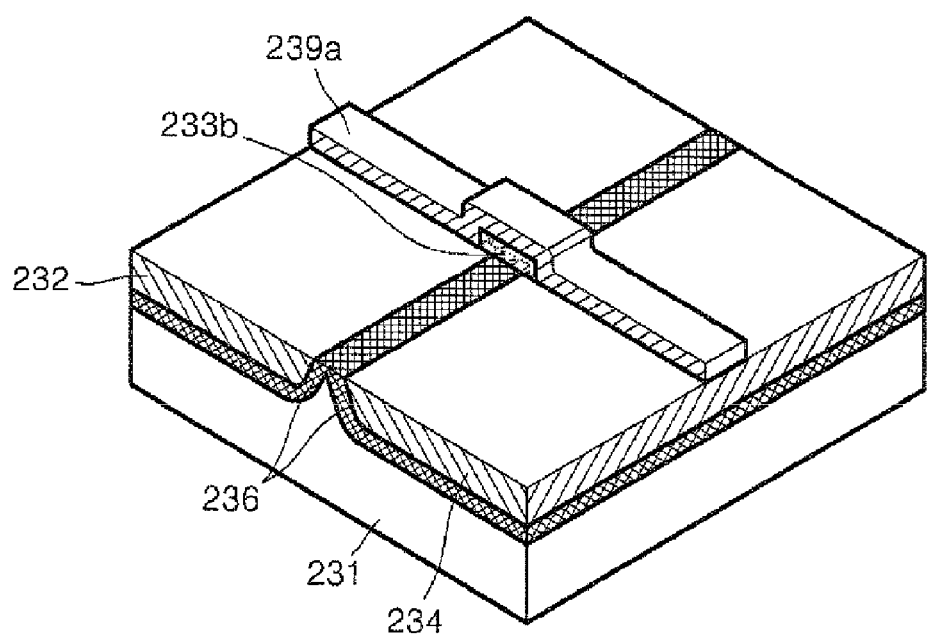

Referring to FIG. 6F, a rectangular second mask 233b is formed by dry etching the stripe shaped first mask 233a where it is not covered by the photoresist layer 239a.

Figure 6G:
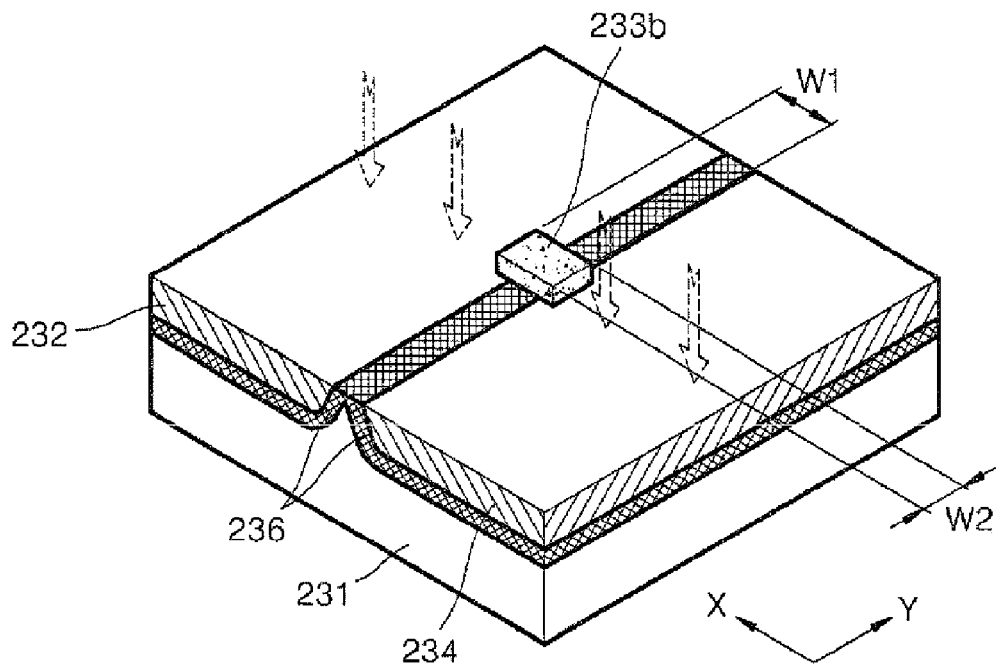

Referring to FIG. 6G, after removing the photoresist layer 239a, the silicon substrate 231 is wet etched or dry etched using the rectangular second mask 233b as a mask.

Figure 6H:
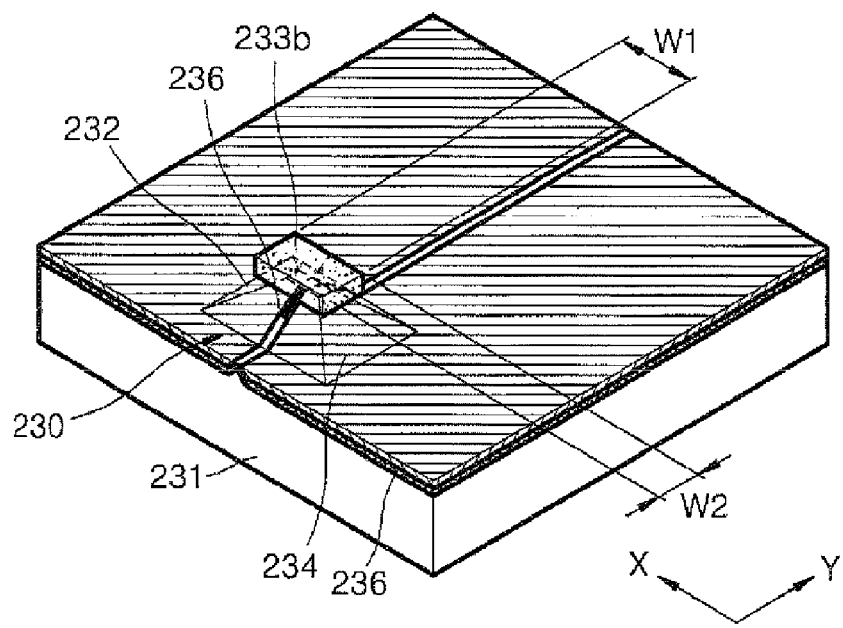

Referring to FIG. 6H, the first and second semiconductor electrode regions 232 and 234 are formed on the slopes of a tip 230, and the resistance regions 236 are self-aligned at an end portion of the tip 230. In the etching process of the silicon substrate 231 under the rectangular second mask 233b, etching is slower in an X direction than in a Y direction. Therefore, in a state that a tapered end portion is formed in the Y direction, the etching in the X direction is performed such that the tapered end portion can have a certain length. That is, a wedge shape resistive tip is formed.

Figure 6I:
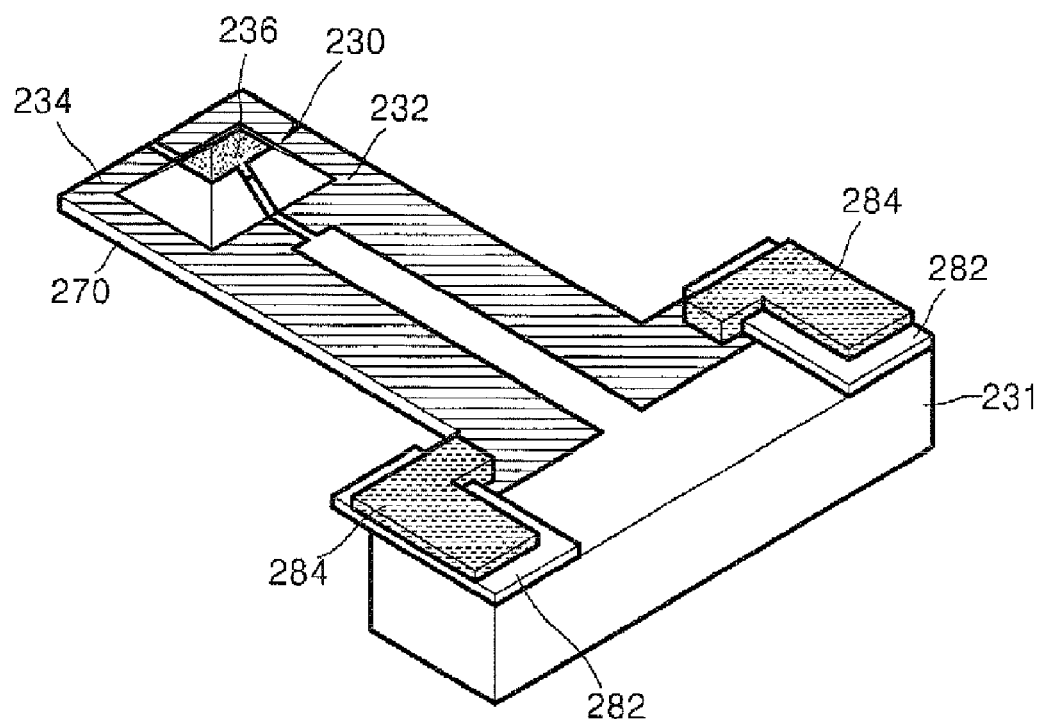

Next, a cantilever 270 is formed by etching the lower surface of the silicon substrate 231 so that the resistive tip 230 is located on one end of the cantilever 270, and the first and second semiconductor electrode regions 232 and 234 are connected to electrode pads 284 insulated by insulating layers 282 on the silicon substrate 231. Thus, a semiconductor probe as depicted in FIG. 6I is completed.

Figure 7:
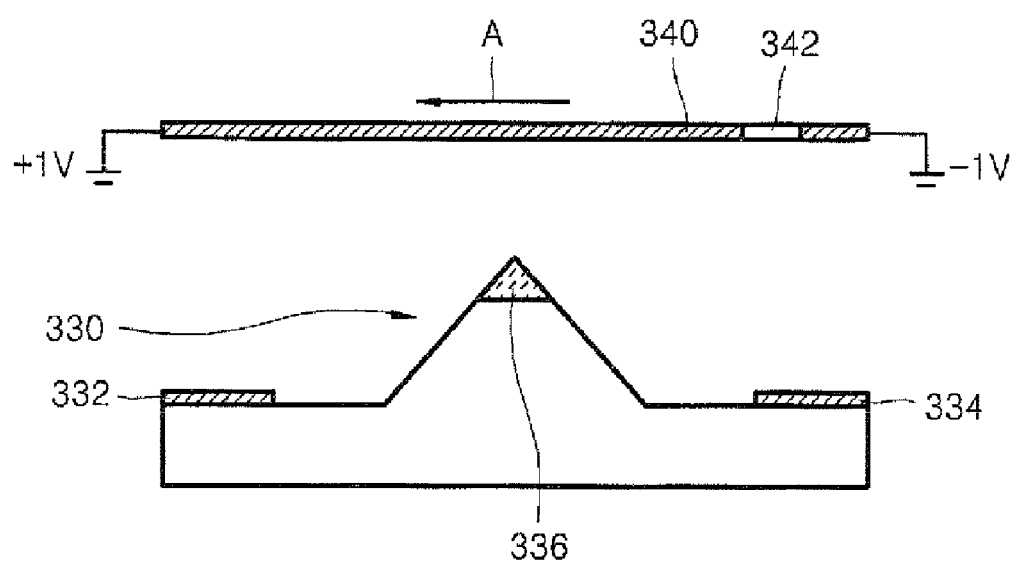
FIG. 7 is a cross-sectional view of a probe used for the simulation for comparison of spatial resolution between a conventional semiconductor probe and a semiconductor probe having a wedge shape resistive tip according to an exemplary embodiment of the present invention.
Figure 8:
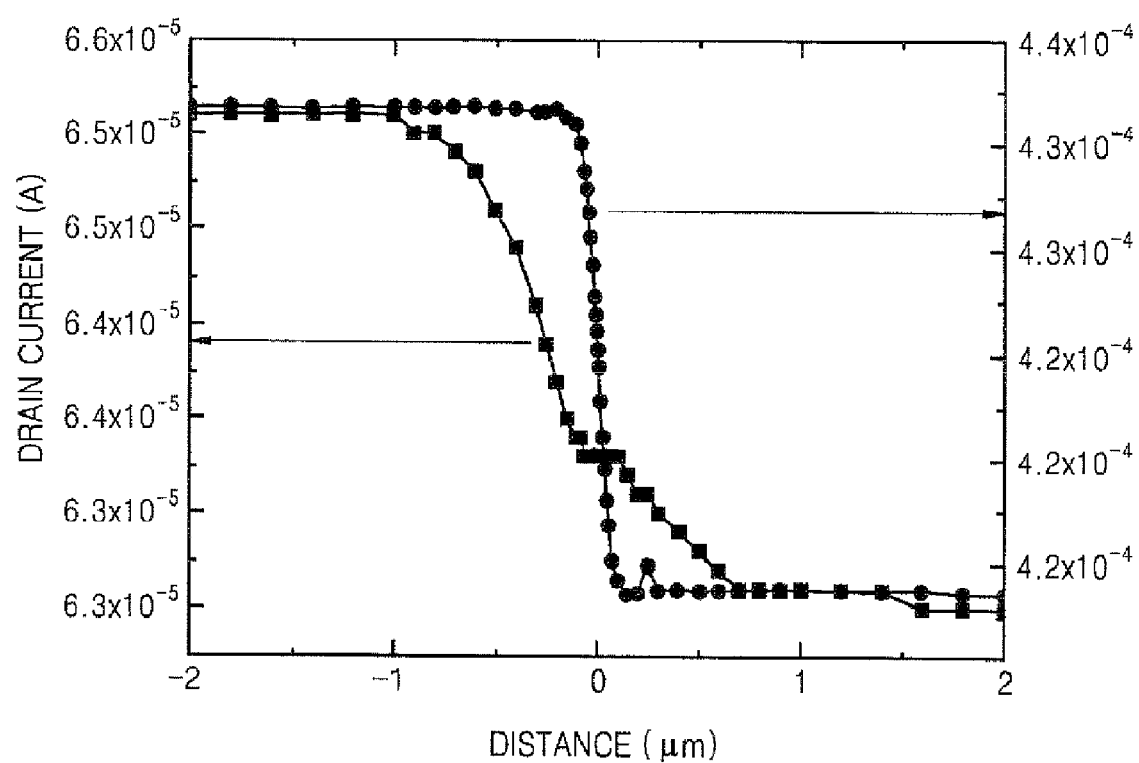
FIG. 8 is a graph showing the measurement results of drain current according to the variation of charge using the probe of FIG. 7.

FIG. 7 is a cross-sectional view of a probe used for the simulation for comparison of spatial resolution between a conventional semiconductor probe and a semiconductor probe having a wedge shape resistive tip according to an exemplary embodiment of the present invention. FIG. 8 is a graph showing the measurement results of drain current according to the variation of charge using the scanning probe of FIG. 7.

Referring to FIGS. 7 and 8, source and drain regions 332 and 334 are formed on both sides of a resistive tip 330, and a resistance region 336 is formed on an end portion of the resistive tip 330. A metal 340 for applying a floating voltage is formed on a location separated from the end of the resistance region 336. The metal 340 has an opening 342 with a diameter of 10 nm. Floating voltages of +1V and −1V were applied to the metal 340, and drain currents of the resistive tip 330 were calculated while moving the floating current in a direction indicated by the arrow A. The simulation according to the exemplary embodiment of the present invention was performed using a wedge shape resistive tip having a length of 300 nm. A conventional resistive tip had a wedge length of "0".

The measurement result shows that a transition-width between the + charges and − charges of the wedge shape resistive tip according to an exemplary embodiment of the present invention is much sharper than the transition-width of the conventional resistive tip. Also, when a drain voltage of 2.3V was applied, the drain current of the wedge shape resistive tip according to an exemplary embodiment of the present invention was approximately 10 times larger than that of the conventional resistive tip when detecting the charges of the metal 340. This indicates that the highly doped semiconductor electrode regions formed on both sides of the resistance region 336 of the wedge shape resistive tip 330 increase the resolution of the resistance region 336.

Figure 9A:
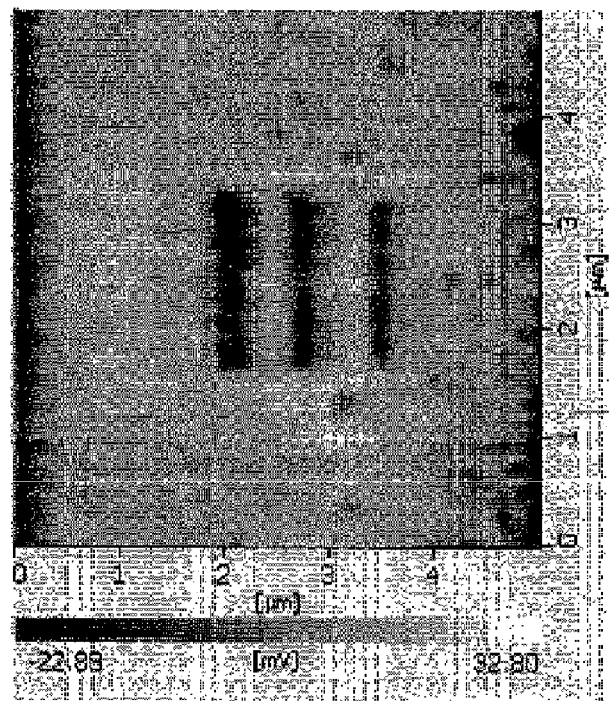
FIGS. 9A and 9B are SEM images for comparison of reading data using a conventional semiconductor probe and a semiconductor probe according to an exemplary embodiment of the present invention, respectively.
Figure 9B:
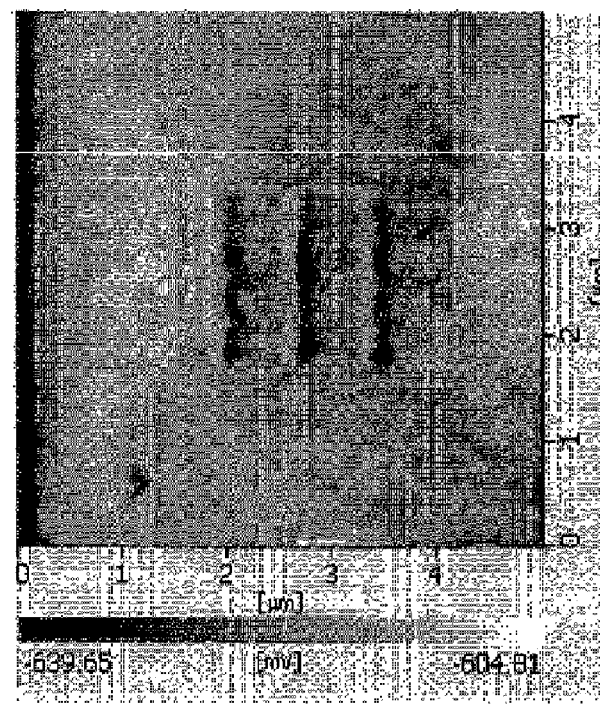

FIGS. 9A and 9B are SEM images for comparison of reading data using a conventional semiconductor probe and a semiconductor probe according to an exemplary embodiment of the present invention. FIG. 9A is an SEM image from a conventional semiconductor probe and FIG. 9B shows an image from a semiconductor probe according to an exemplary embodiment of the present invention.

Experimental conditions were as follows:
Back poling: 3 μm×3 μm, +8V
Writing: −10V, −8V, and −6V
Reading area & speed: 5 μm×5 μm, 10 μm/sec Referring to FIGS. 9A and 9B, it is seen that the semiconductor probe having a wedge shape resistive tip according to an exemplary embodiment of the present invention has a higher resolution than a conventional semiconductor probe.

According to a semiconductor probe having a wedge shape resistive tip of the exemplary embodiment of the present invention, conductive regions formed on both sides of a resistance region formed on an end portion of the resistive tip define a resistance region, and thus, the resolution of the resistance region is increased.

According to a method of fabricating a semiconductor probe having a wedge shape resistive tip, the wedge shape resistive tip having conductive regions on both sides of an end portion of a resistance region is formed by etching a silicon substrate using a rectangular mask.

The wedge shape resistive tip can be used for scanning probe techniques or ultra small information storage devices, allowing an apparatus to read or write information by detecting or forming charge in a small region.

While the present invention has been particularly shown and described with reference to exemplary embodiments thereof, it should not be construed as being limited to the embodiments set forth herein, but as an example. Those skilled in this art may fabricate various shapes of probe without departing from the spirit and scope of the present invention. Therefore, the scope of the invention is defined not by the detailed description of the invention but by the appended claims, and all differences within the scope will be construed as being included in the present invention.

What is claimed is:

1. A semiconductor probe comprising:
    a resistive tip that is doped with a first impurity, has a resistance region doped with a low concentration of a second impurity having an opposite polarity to the first impurity, and has first and second semiconductor electrode regions doped with a high concentration of the second impurity on both side slopes of the resistive tip; and
    a cantilever having the resistive tip on an edge portion thereof, wherein an end portion of the resistive tip has a wedge shape,
    wherein the end portion in a length direction of the wedge shape of the resistive tip is a single flat surface comprising:
        a first side portion formed by an end portion of the first semiconductor electrode region,
        a second side portion formed by an end portion of the second semiconductor electrode region, and
        a central portion interposed between the first and second side portions and formed by an end portion of the resistance region,
    wherein the end portion of the first semiconductor electrode region, the end portion of the second semiconductor electrode region and the end portion of the resistance region are flat surfaces on a same plane.

2. The semiconductor probe of claim 1, wherein the end portion of the resistive tip has a width of 20 nm to 2 μm.

3. The semiconductor probe of claim 1, wherein the first impurity is a p type impurity and the second impurity is an n type impurity.

4. The semiconductor probe of claim 1, wherein the first impurity is an n type impurity and the second impurity is a p type impurity.

* * * * *